United States Patent [19]

Higgins

[11] Patent Number: 4,991,307

[45] Date of Patent: Feb. 12, 1991

[54] CARPET TILE CUTTER

[75] Inventor: Kenneth B. Higgins, LaGrange, Ga.

[73] Assignee: Milliken Research Corporation, Spartanburg, S.C.

[21] Appl. No.: 405,752

[22] Filed: Sep. 11, 1989

[51] Int. Cl.[5] .................... G01B 1/00

[52] U.S. Cl. .................... 33/526; 30/293; 83/468.1

[58] Field of Search .............. 30/293; 83/468.1, 468.2, 83/468.6, 614, 743, 745; 33/32.2, 526, 527, DIG. 2 D

[56] References Cited

U.S. PATENT DOCUMENTS 2,619,173 11/1952 Crain .

3,611,579 10/1971 Reid .................... 33/DIG. 20

3,807,269 4/1974 Mertes .................... 83/468

4,651,607 3/1987 Camp .................... 83/745

*Primary Examiner*—Douglas D. Watts

*Attorney, Agent, or Firm*—Earle R. Marden; H. William Petry

[57] ABSTRACT

Apparatus and method to properly mark and/or cut to size the carpet tiles which are used to complete the carpeted areas adjacent walls, doors, etc. in an area to be carpeted. The apparatus encompasses a machine which is placed against a carpet tile already in position and has spring loaded arms which extend therefrom to a point abutting the wall or door structure to fix the position of a cutter on the apparatus so that it cuts the actual size necessary to fill the gap between the previously laid tile and the wall or door sensed by the spring loaded arms.

19 Claims, 6 Drawing Sheets

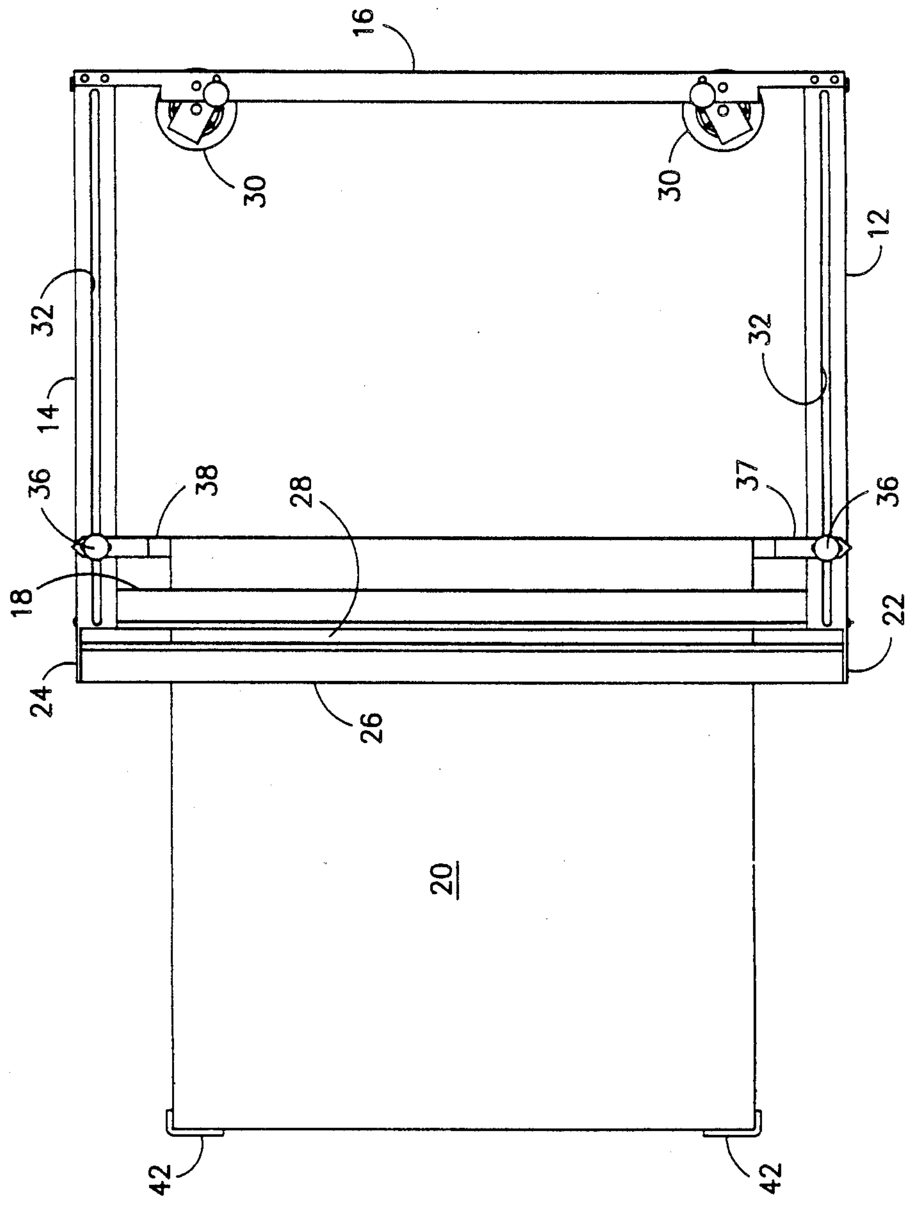
FIG. —3—

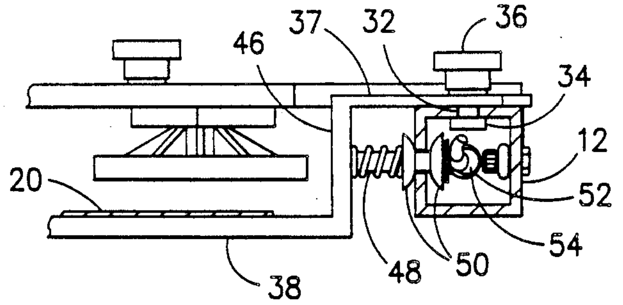
FIG. –4–
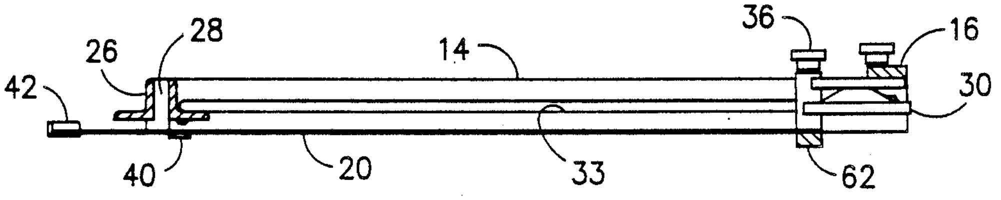
FIG. –5–
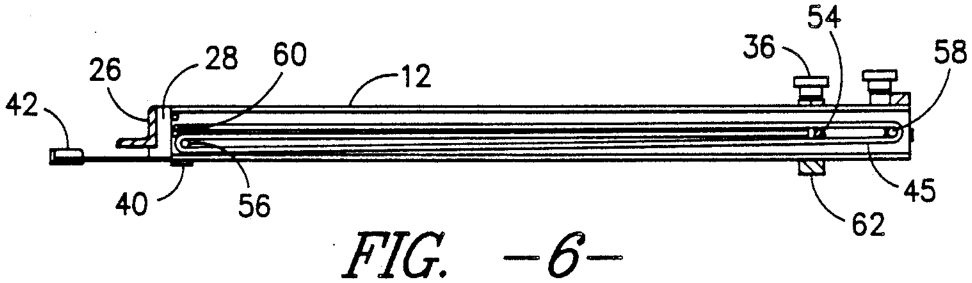
FIG. –6–
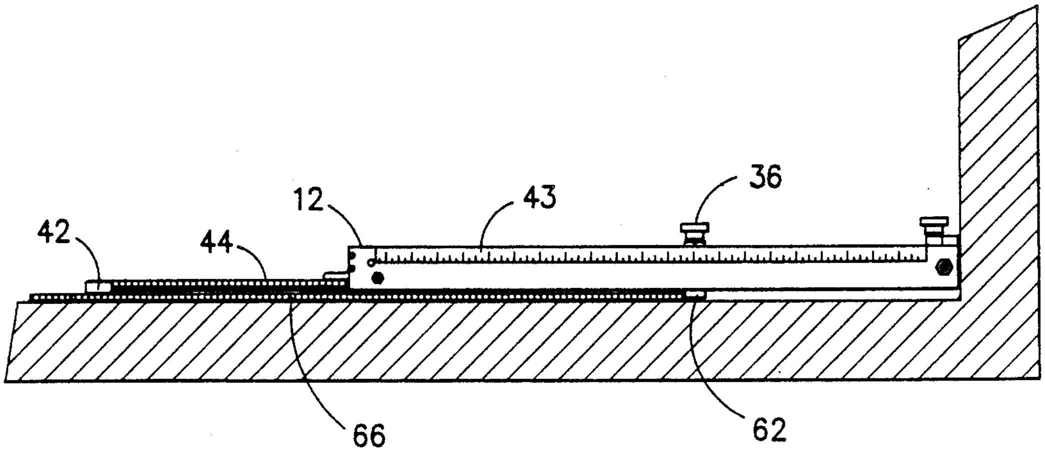
FIG. –7–

CARPET TILE CUTTER

This invention relates to a machine to accurately cut carpet tiles which are placed adjacent the exterior surfaces, such as walls, of an area being carpeted and the area to be covered by the tile is smaller than the standard carpet tile.

Therefore, an object of the invention is to provide a method and a machine to accurately cut carpet tiles for areas smaller than the standard carpet tile.

Other objects and advantages of the invention will become clearly apparent as the specification proceeds to describe the invention with reference to the accompanying drawings in which:

FIG. 3 is a view similar to FIG. 1 except the tile tray is shown in an extended position;

Figure 1:
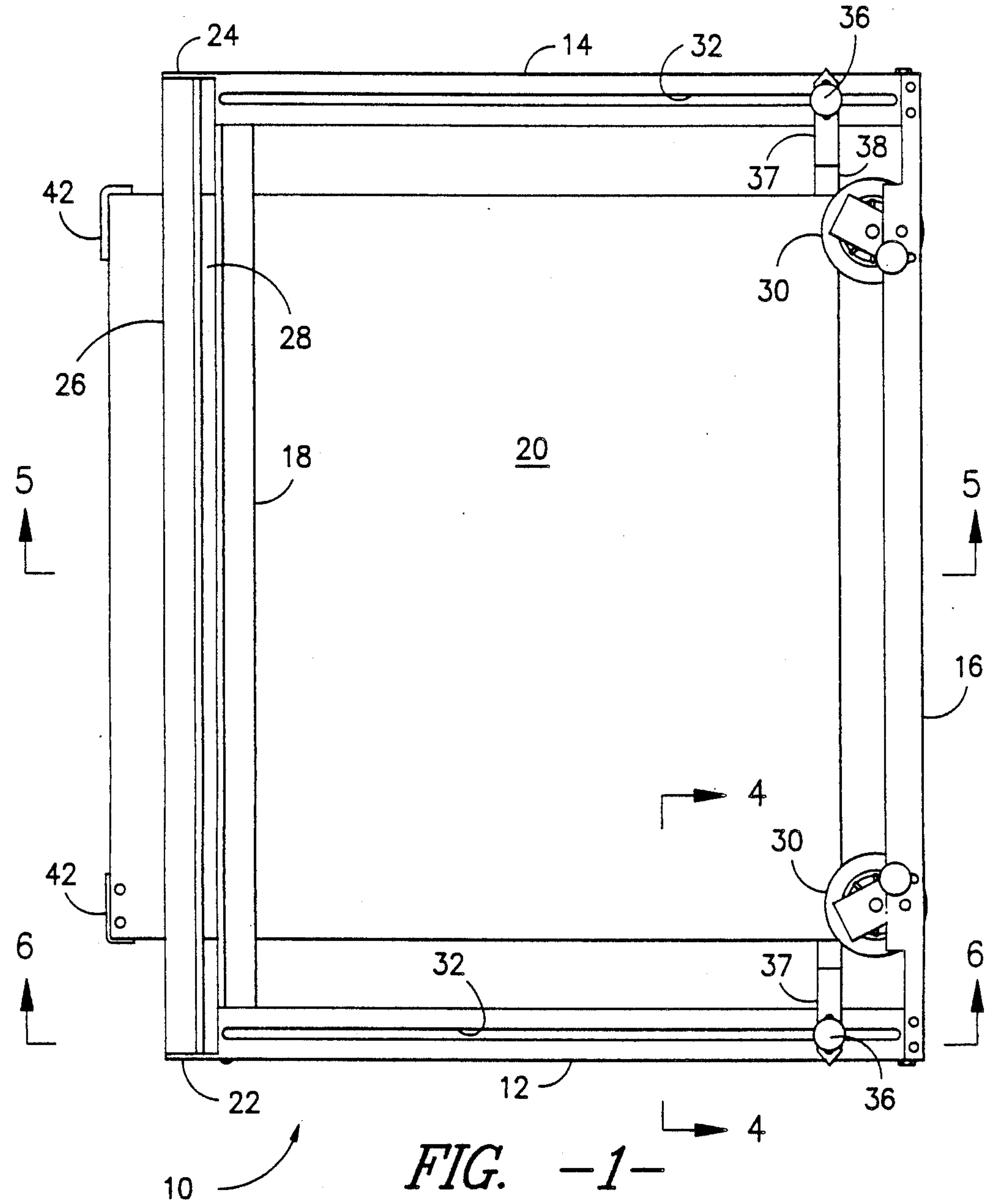
FIG. 1 is a top view of the new and improved carpet tile cutter.
Figure 2:
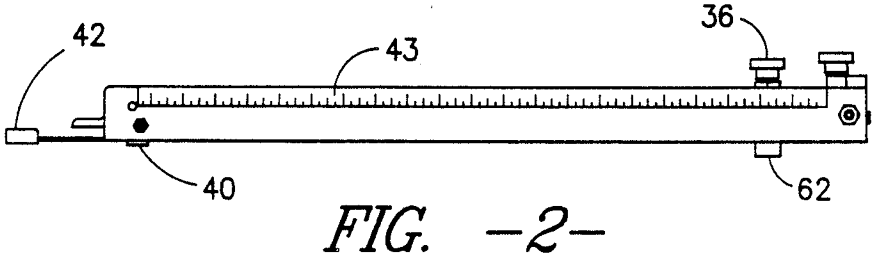
FIG. 2 is a side elevation view of the tile cutter shown in FIG. 1.
Figure 8:
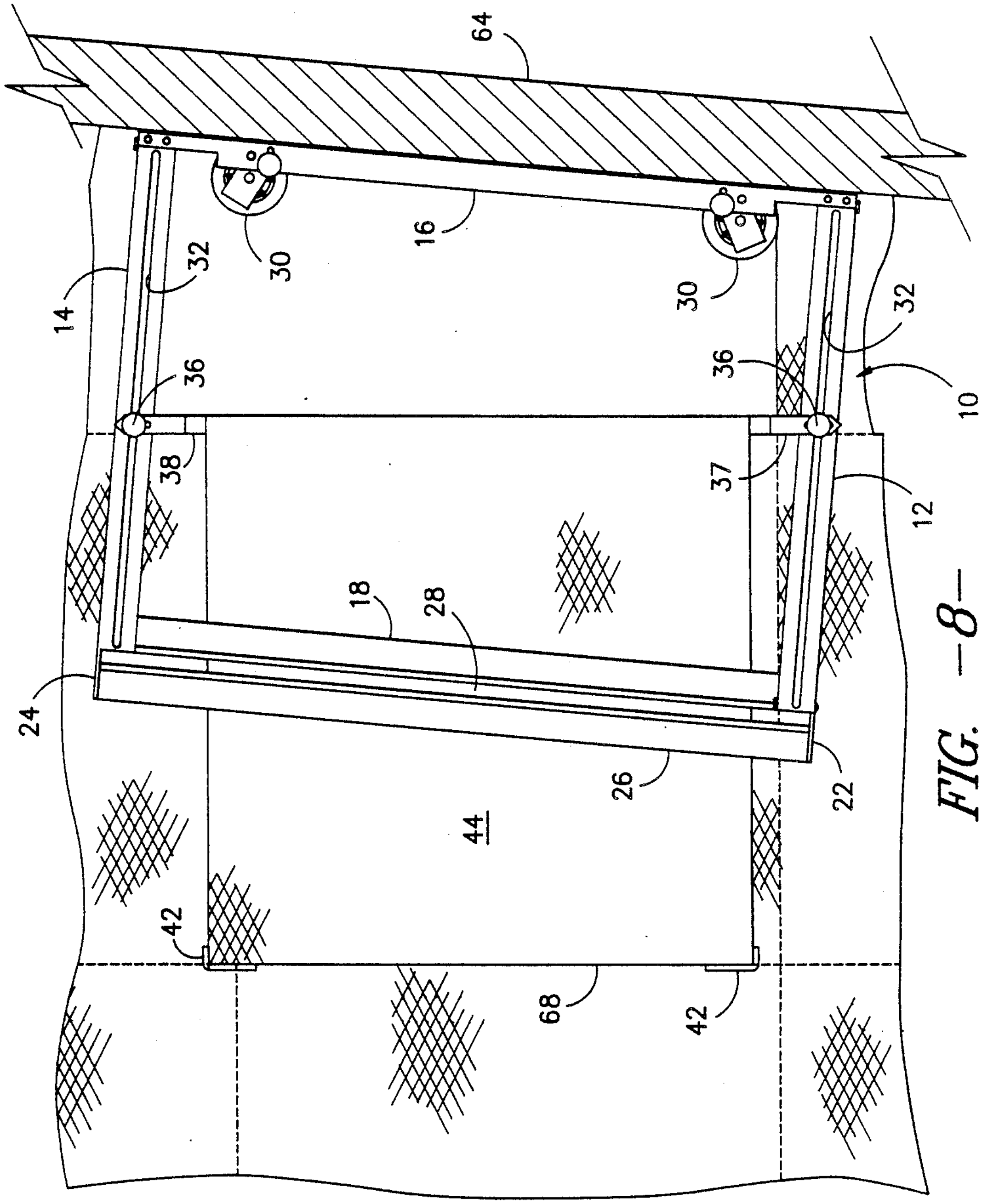
Figure 9:
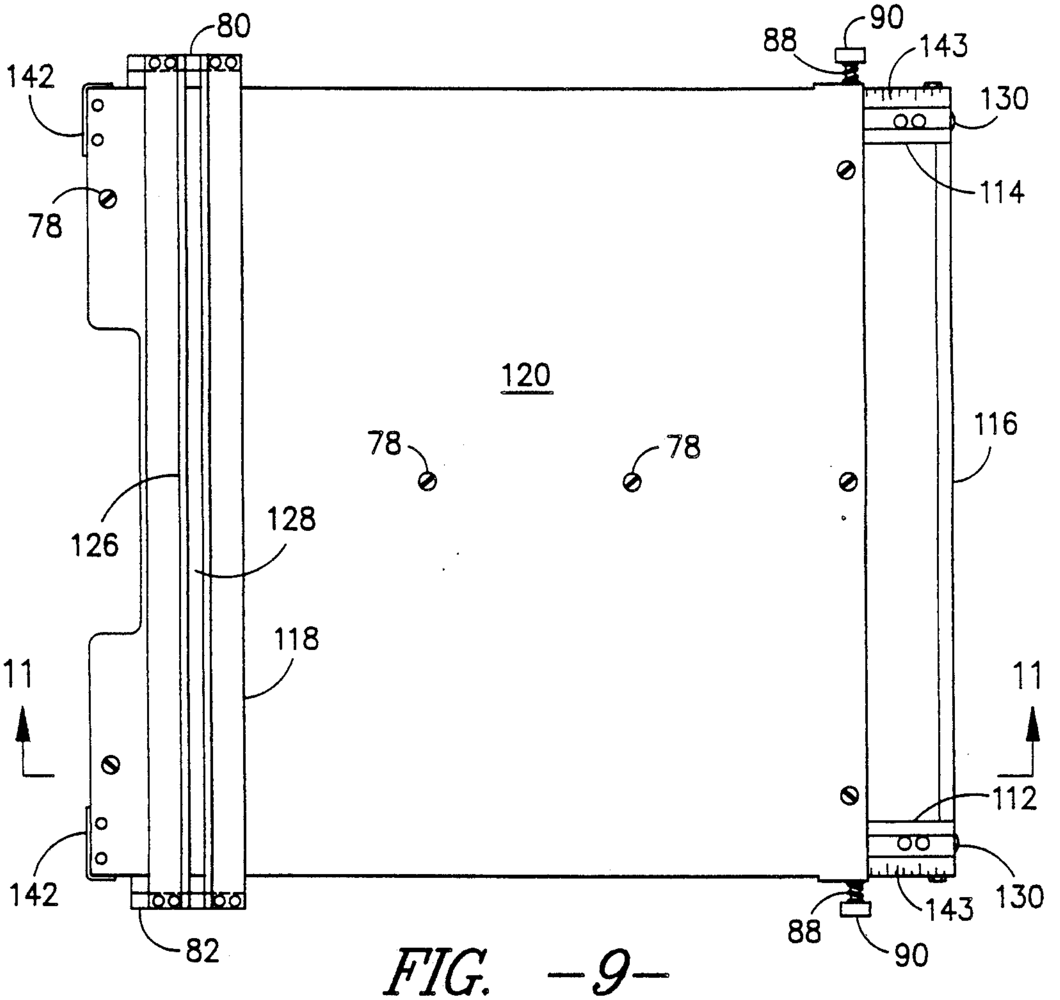
Figure 10:
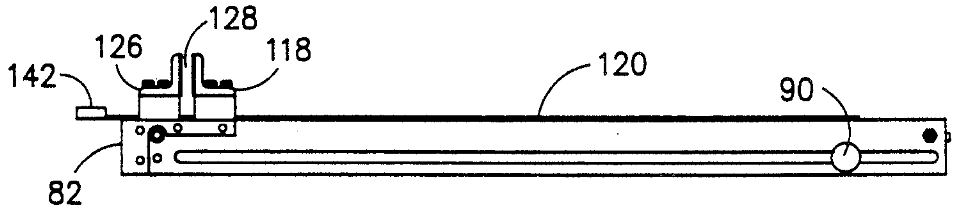
Figure 11:
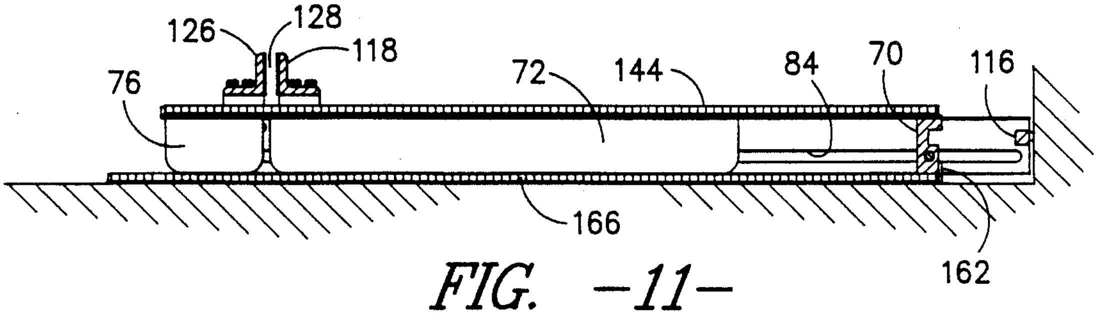
Figure 12:
Figure 13:
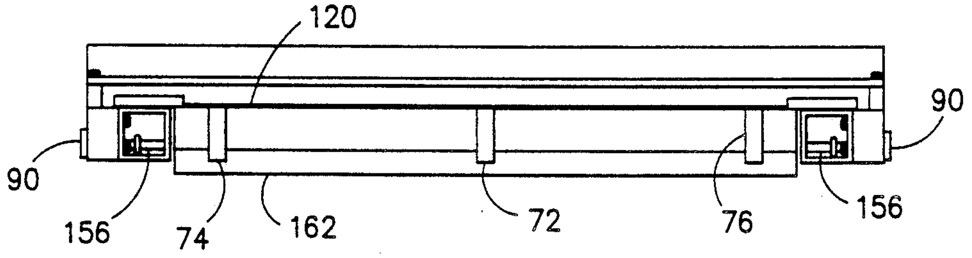

FIGS. 4, 5 and 6 are cross-section views taken on lines 4, 5 and 6, respectively, of FIG. 1;

FIGS. 7 and 8, respectively, are side and top views of the cutter of FIGS. 1–6 shown in place against a wall to cut a tile member;

FIG. 9 is a view similar to FIG. 1 showing a modification of the invention;

FIG. 10 is a side elevation view of the cutter shown in FIG. 9;

FIG. 11 is a cross-section view taken on line 11—11 of FIG. 9 showing the cutter in position against a wall member;

FIG. 12 is a right hand end view of the tile cutter shown in FIG. 9;

FIG. 13 is a left hand end view of the tile cutter shown in FIG. 9, and

Figure 14:
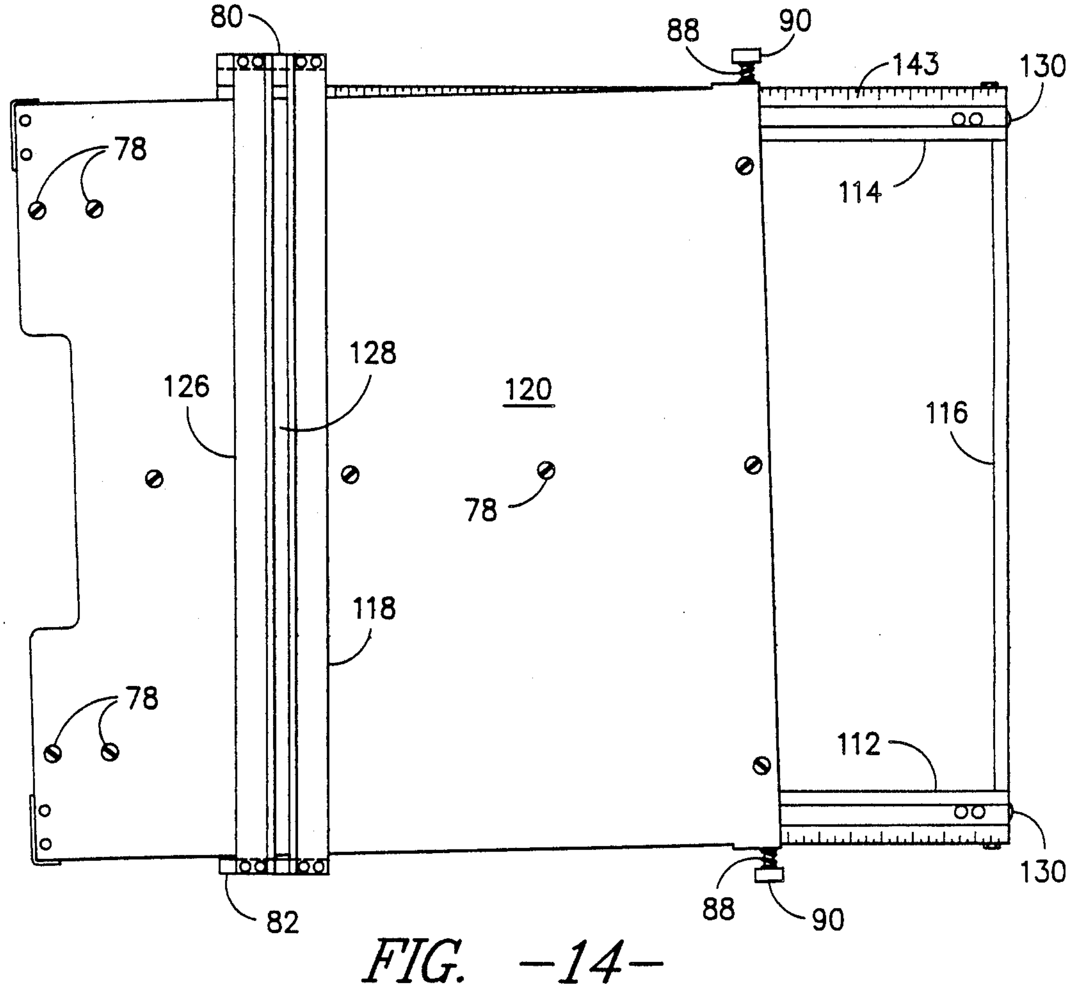

FIG. 14 is a top view similar to FIGS. 1 and 9 showing the position of the cutter elements when it is placed in position against a wall member.

When laying carpet tiles of certain selected sizes such as 18" square, the tiles are normally laid initially in the center of the area to be carpeted and built outwardly therefrom towards the walls and doors surrounding the carpeted area. When the carpet tiles have reached a point where the remaining areas to be carpeted are less than the standard carpet tile size, e.g. 18", then each carpet tile must be cut to conform to the remaining area. Before this invention, it was necessary to measure each remaining area and then lay out the measured distance on the tile and then cut the carpet tile or to lay oversized carpet into the remaining space with the excess up the wall and hand scribe or cut. To eliminate this long and tedious procedure the carpet cutting machine described herein was designed for this use.

Looking now to FIGS. 1 and 3 of the drawings, the carpet tile cutter 10 is shown in a plan view and consists basically of two slotted tubular members 12 and 14, an interconnecting front member 16, an interconnecting rear member 18 and a carpet tile support plate 20. Both of the rear portions of the members 12 and 14 have plates 22 and 24, respectively, projecting therefrom to support the angle member 26 therebetween to provide a space 28 between it and the rear of interconnecting member 18 for the insertion of a cutting tool. Each of the members 12, 14, 16, 18 and 26 are fixed relatively to each other but are movable relative to the carpet tile support 20. For reasons hereinafter explained a pair of wheels 30 are rotatably mounted to the underside of the interconnecting front member 16.

For reasons hereinafter explained tubular members 12 and 14 have elongated slots 32 in the top thereof and elongated slots 33 on the inside thereof. Located in the slots 33 is a locking member 34 which is connected to a lock cap 36 which can be screwed down to lock the tubular members 12 and 14 relative to the carpet tile support plate 20 through the U-shaped support bar 37. The support bar 37 extends between the tubular members 12 and 14 and has one end of the carpet tile support plate 20 connected to the bottom portion 38 thereof. The rear of the carpet tile support plate 20 is slidably supported on top by a bar 40 connected to the underside of the interconnecting rear member 18 and has carpet tile restricting member 42 on the edges thereof to accommodate one end of a carpet tile 44 placed thereon. The outside of the tubular members 12 and 14 and calibrated at 43 so that the tubular members 12 and 14 can be located a number of times in the same position relative to the carpet tile 44 on the carpet tile support member 20.

For operation of the herein disclosed cutter it is necessary that there be relative movement between the tubular members 12 and 14 and the carpet tile support plate 20. To accomplish this movement an elastic member 45 (FIG. 6) is located within the confines of each of the tubular members 12 and 14. Mounted on each of the upstanding walls 46 of the U-shaped bar 37 is a spring-loaded pin 48 held in slots 32 by collars 50 and has a ring member 52 on the end thereof. The elastic member 45 projects through the ring member 52 and has a knot 54 tied in the end thereof to prevent the elastic member from pulling out. The elastic member 45 is stretched over pins 56 and 58 connected inside the tubular members 12 and 14 and tied to pin 60 so that if the lock caps 36 are not screwed down the tubular members 12 and 14 are pulled outward away from the carpet tile support tray 20 as shown in FIGS. 3, 7 and 8.

OPERATION

For purposes of transportation the tubular members 12 and 14 are pushed back against the tension of the elastic member 45 and the lock caps 36 screwed down to prevent sliding movement between the plate 20 and the members 12 and 14 to assume the condition shown in FIG. 1. Then when it is necessary to cut a standard tile 44 for placement adjacent a wall, etc. in an area of smaller dimension, the lock caps 36 are unscrewed and the tubular members 12 and 14 allowed to slide outward in the slots 32 as shown in FIG. 3. Then the wheels 30 are placed against the wall 64 (FIG. 8) and the cutter frame slid forward until the foot 62 engages the outer edge of a previously laid tile 66 (FIG. 7). The lock caps 36 can be screwed down and a standard carpet tile 44 with the fabric surface up is laid onto the support 44 with one edge engaging the members 42. A carpet knife is then inserted in the space 28 between the members 18 and 26 and run across the surface of the tile to score same. Then the tile 44 is broken on the score line and the piece 68 can be placed in space between the wall 64 and the previously laid tile 66 after the carpet cutter has been removed. If desired, multiple pieces of the same size tile can be cut by using the same measurements indicated on the calibrated scale 43 on the sides of the tubular members 12 and 14.

FIGS. 9–14 show a modification of the carpet tile cutter of FIGS. 1–8 with tile members being given a reference number of 100 plus the previous reference number. The basic difference between the two concepts is that the carpet support tray 120 is located on top of the tubular members 112 and 114 rather than on the side.

The carpet support tray 120 is supported at the front by a notched bar 70 and towards the rear by the plate 72 and plates 74 and 76 secured to the underside of the tray 120 by suitable screws 78. As in the embodiment of FIGS. 1-8 the bar 70 has a plate 162 to engage the previously laid carpet tile 166 and members 42 to position the carpet tile 144 to be cut.

To provide a space for the carpet tile 144 to be slid under end support members 80 and 82 are secured to the tubular members 112 and 114, respectively, to support the angle members 118 and 126 to provide the space 128 for insertion of the carpet cutting or scoring knife (not shown).

To prevent and allow the tubular members 112 and 114 to be slid in the slots 84 and 86 on the inside walls of the tubular members 112 and 114 the locking member 34, 36 of FIGS. 1-8 has been redesigned to comprise a single screw 88 which projects through each of the tubular members 112 and 114 and engages the sides of notched bar 70 to lock it in place when the carp 90 of the screw 88 is screwed inward. Integral with the screw 88 and centrally thereof is the ring 152 for holding the knit 154 of the elastic member.

The modification of FIGS. 9-14 operates basically like that of FIGS. 1-8 except the spacing between the tubular member 112 and 114 is such that a standard fits snugly between the supports 80 and 82 on the carpet support tray 112 and the cutting device 10 can be placed directly in position over the area that requires a smaller than standard length of carpet tile.

It can be seen that a carpet tile cutting apparatus has been described which is simple in construction and can readily be handled by an operator to cut the desired lengths of carpet tile for use on the perimeter areas of a carpet tile installation job.

Although the preferred embodiments of the invention have been described it is contemplated that changes may be made without departing from the scope or spirit of the invention and it is, therefore, desired that the invention be limited only by the scope of the claims.

I claim:

1. An apparatus to mark tiles accurately for cutting and placement in an area smaller than a standard tile comprising: a pair of tubular members spaced from one another, a first means interconnecting said tubular members at one end, a second means connected to each of said tubular members at the other end, biasing means in each of said tubular members biasing said second means outwardly from said first means, a wall abutment means mounted in operable association with said second means, a third means located between said tubular members to support a tile and a fourth means located above said third means to accommodate a cutter means to cut a tile on said third means when said second mean is slid by said tubular members when said wall abutment means is forced against a wall member.

2. The apparatus of claim 1 wherein said biasing means is located within the confines of said tubular members.

3. The apparatus of claim 2 wherein a tile contact plate is connected to and defends downwardly from the front of said third means.

4. The apparatus of claim 3 wherein means are mounted on the rear of said third means to restrict the outward movement of a tile placed thereon.

5. The apparatus of claim 4 wherein said first means and said fourth means include an angle iron member each connected to both of said tubular members.

6. The apparatus of claim 5 wherein said wall abutment means includes wheels connected to said second means.

7. Apparatus to mark tiles accurately for cutting and placement in an area smaller than a standard tile comprising: a pair of tubular members spaced from one another, a first means interconnecting said tubular members at one end, a second means connected to each of said tubular members at the other end, biasing means in each of said tubular members biasing said second means outwardly from said first means, a wall abutment means mounted on said second means, a third means located between and below said tubular members to support a carpet tile and a fourth means located above said third means to accommodate a cutter means to cut a tile on said third means when said second means is slid by said tubular members when said wall abutment means is forced against a wall member.

8. The apparatus of claim 7 wherein said third means includes a U-shaped member slidably mounted with respect to said tubular members.

9. The apparatus of claim 8 wherein said biasing means is located within the confines of said tubular members.

10. The apparatus of claim 9 wherein a tile contact plate is connected to and defends downwardly from the front of said third means.

11. The apparatus of claim 10 wherein means are mounted on the rear of said third means to restrict the outward movement of a tile placed thereon.

12. The apparatus of claim 11 wherein said first means and said fourth means includes an angle iron member each connected to both of said tubular members.

13. The apparatus of claim 12 wherein said wall abutment means includes wheels connected to said second means.

14. Apparatus to mark tiles accurately for cutting and placement in an area smaller than a standard tile comprising: a pair of tubular members spaced from one another, a first means interconnecting said tubular members at one end, a second means connected to each of said tubular members at the other end, biasing means in each of said tubular members biasing said second means outwardly from said first means, a wall abutment means operable associated with said second means, a third means located between and above said tubular members to support a tile and a fourth means located above said third means to accommodate a cutter means to cut a tile on said third means when said second means is slid by said tubular members when said wall abutment means is forced against a wall member.

15. The apparatus of claim 14 wherein said first means and said fourth means include an angle iron member each connected to both of said tubular members.

16. The apparatus of claim 15 wherein said abutment means includes wheels in said tubular members.

17. The apparatus of claim 16 wherein said biasing means is located within the confines of said tubular members.

18. The apparatus of claim 17 wherein a tile contact plate is connected to and defends downwardly from the front of said third means.

19. The apparatus of claim 18 wherein means are mounted on the rear of said third means to restrict the outward movement of a tile placed thereon.

* * * * *